United States Patent
Teel et al.

[15] 3,657,920
[45] Apr. 25, 1972

[54] SEQUENTIAL SAMPLER

[72] Inventors: Dale M. Teel; John H. Putnam, Jr., both of Idaho Falls, Idaho

[73] Assignee: The United States of America as represented by the United States Atomic Energy Commission

[22] Filed: May 6, 1970

[21] Appl. No.: 35,098

[52] U.S. Cl..................................................73/28
[51] Int. Cl. ..........................................G01n 1/24
[58] Field of Search..........................73/28, 421.5

[56] References Cited

UNITED STATES PATENTS 3,540,261 11/1970 Scoggins....................................73/28
2,119,288 5/1938 Raymond...................................73/28

Primary Examiner—S. Clement Swisher
Attorney—Roland A. Anderson

[57] ABSTRACT

A sampler for collecting a series of samples of aerosols from the atmosphere. The sampler utilizes a removable head having mounted therein a plurality of sampling units which are sequentially actuated to obtain samples at regular intervals over long periods of time. The head carrying the sampling units is readily replaceable and the whole device is designed for remote operation.

4 Claims, 2 Drawing Figures

PATENTED APR 25 1972

3,657,920

INVENTORS.
DALE M. TEEL
BY JOHN H. PUTNAM, JR.

SEQUENTIAL SAMPLER

BACKGROUND OF THE INVENTION

The invention described herein was made in the course of, or under a contract with the United States Atomic Energy Commission.

The operation of a nuclear reactor and other apparatus related to the application of nuclear energy requires an array of safety procedures including that of monitoring the composition of gaseous effluents and the atmosphere of the surrounding environment.

Several types of stacked filter samplers are now being used throughout the industry to gather fission product samples. Some have a valving arrangement at the inlet to take a number of samples at varying time intervals. This inlet valving and tubing rob a portion of the sample being collected due to plateout, absorption in elastomers, etc. In addition, a gas monitoring technique used by other samplers pulls the sample gas outside the containment atmosphere where it is cooled and dried before the flow measurement is taken. This method of monitoring is not practical in a full sized containment vessel due to length of line runs, number of samplers, and safety limitations of vessel penetrations. For these and other reasons the samplers now in use are not fully adequate for the task of monitoring over large periods of time and in remote locations the effluent from reactor installations.

SUMMARY OF THE INVENTION

The sampler of this invention overcomes or minimize the problems mentioned above associated with samplers now in use. In accordance with this invention, the sampler is provided with a head in which are mounted a plurality of closed filter collecting devices using stacked filters, termed filter trains. An indexing table on which are mounted a pair of air cylinders is caused to rotate in a series of spaced steps. During each stationary interval of time the air cylinders are expanded at will exposing one of the filter trains. A cycling system is actuated to draw the gaseous medium through the filter train which is thereafter retracted. The indexing table is then indexed along its axis of rotation and the cycle is repeated for another filter train.

An important aspect of the invention is making the head containing the filter trains readily removable so that the samples can be collected with the removal of a minimum of equipment. In the laboratory, the filter trains can be removed later for examination.

Another feature of this invention is that the sampler incorporates a unique approach for measuring the sample gas flow wet. A critical orifice is used, that is, when the downstream pressure is approximately one-half or less of the upstream pressure, sonic velocity will occur in the throat of the orifice. This velocity cannot be increased by further reducing the downstream pressure. While sonic velocity varies with the square root of the temperature of the gas flowing, it remains relatively constant over the temperature range of the sampler of this invention, and is a known value for any given set of conditions. Since the area of the throat is constant, the volume of the sample gas remains relatively constant and is also known for any given set of conditions. A mass flow meter in the system measures and records the mass of the sample gas thereby knowing the volume, mass, temperature, and pressure upstream of the orifice. Hence, a great deal is known about the sample gas flowing including all the measurements taken in the dry monitoring system used by other samplers. Sufficient is obtained this way so that a very good estimate of moisture trapped can be made if desired.

It is thus a principal object of this invention to provide a remotely operated sequential sampling device.

Other objects and advantages of this invention will become apparent from the following description of a preferred embodiment of this invention.

DESCRIPTION OF THE PREFERRED EMBODIMENT

Figure 1:
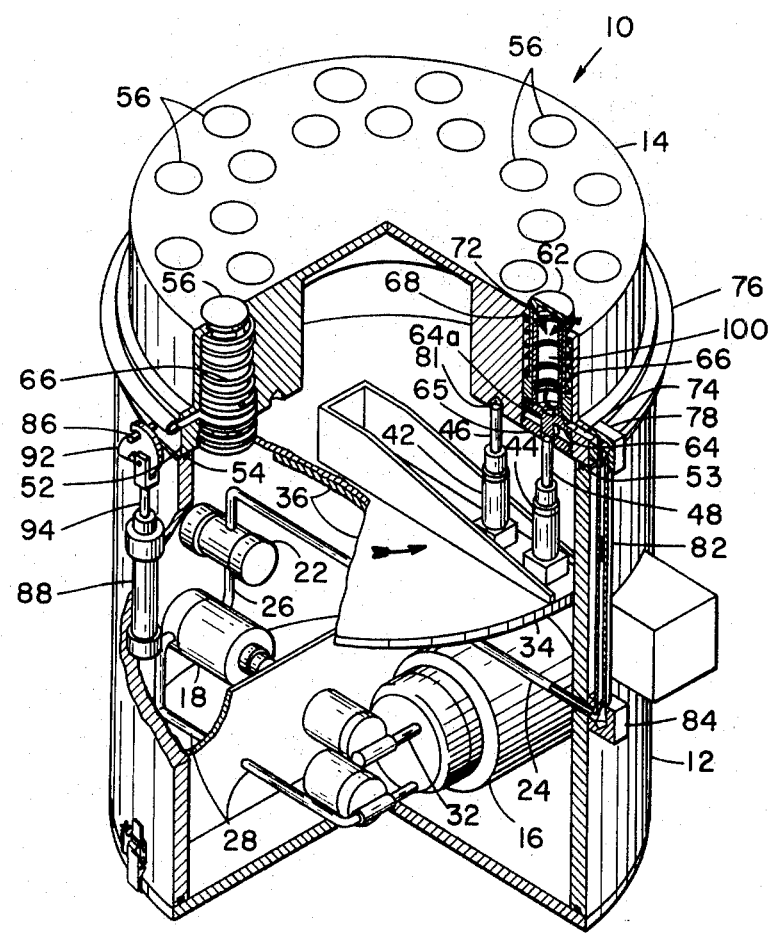
FIG. 1 shows an isometric view, partially cut away, of a preferred embodiment of the invention.

Referring to FIG. 1, sampler 10 consists of a cylindrical lower section 12 on which is mounted an upper removable cylindrical head section 14.

Lower section 12 contains a vacuum pump 16, a flow meter 18, and a critical flow orifice 22. A conduit 24 extending through the wall of lower section 12 carries the gas being drawn by vacuum pump 16 into critical orifice 22, meter 18, and pump 16, by way of conduits 26 and 28. The gas is exhausted back into the atmosphere by way of pipe 32.

In the upper portion of lower section 12 is a flat, circular indexing table 34 rotated in the direction shown by the arrow with an air operated indexing mechanism 36. The latter is well known in the art and is commercially available. Table 34 supports a pair of actuators 42 and 44 from which extend actuating plungers 46 and 48, respectively. Actuators 42 and 44 may consist of air cylinders which cause the extension of plungers 46 and 48 when high pressure air is delivered to the air cylinders, as is understood in the art. High pressure air is supplied from outside of sampler 10 through a hose, not shown.

Upper section 14 of sampler 10 has a flange 52 which rests on the upper, open edge 53 of lower section 12. An O-ring 54 set in edge 53 provides sealing between upper and lower sections 14 and 12. Mounted within upper section 14 are two concentric rows of equally spaced filter trains 56.

Figure 2:
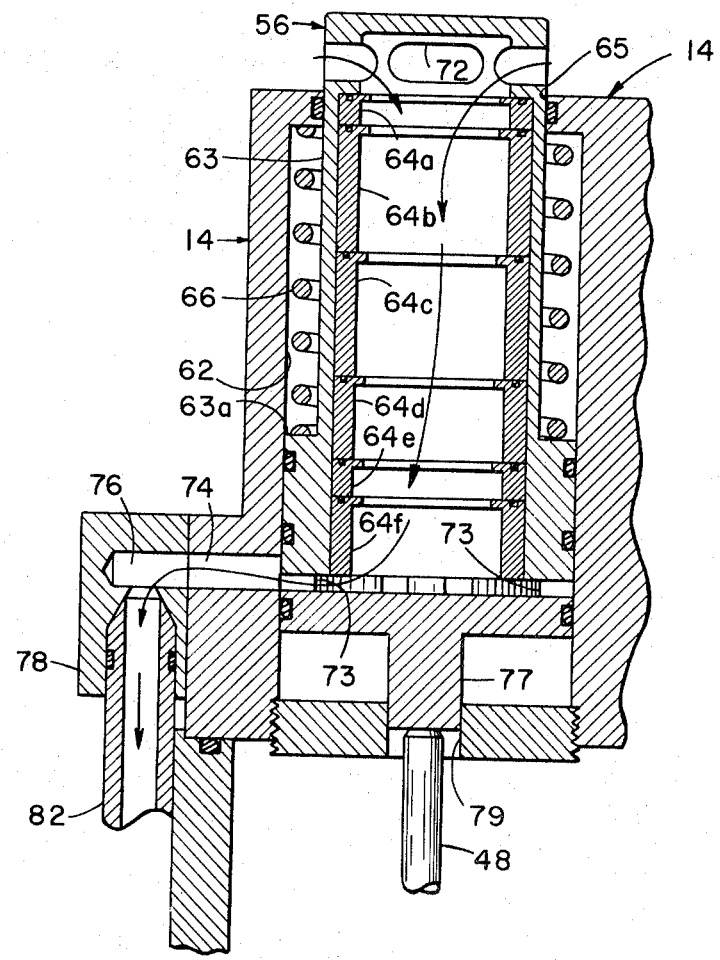
FIG. 2 is a section view showing details of a filter train.

As more particularly shown in FIG. 2, each filter train 56 is housed in a passageway and consists of a hollow piston 63 containing a stack of filter retainers 64a, 64b, 64c, 64d, 64e and 64f. The top portion of piston 63 is sized to slide through an O-ring sealed port 65 in head 14 and the bottom of piston 63 has an enlarged section 63a providing a ledge upon which a spring 66 acts to hold the assembly closed until an external force is applied to force it open. In the position illustrated in FIG. 2, plunger 48 is actuated to compress spring 66 and extend filter train 56 out from the top surface of section 14.

The upper end of piston 63 has side ports 72 to admit aerosol when extended as seen in FIG. 2. While not shown, each of retainer rings 64a–64f would be filled with a filtering material capable of withdrawing some constituent of interest from the aerosol such as iodine, etc. The bottom of piston 63 has openings 73 so that when the former is extended as shown the aerosol will flow as shown by the arrows into an exhaust port 74. When piston 63 is retracted, openings 72 and 73 are closed off.

Each exhaust port 74 for a filter train 56 terminates in a common annular exhaust manifold 76. The latter is provided with a female fitting 78 to receive one end of a conduit 82 to carry exhausted gas through a fitting 84 into pipe 24 inside of lower section 12. The bottom of piston 63 is provided with an extension 77 to be engaged by the plunger from one of actuators 42 or 44, such as plunger 48 shown, through an opening 79 illustrated.

As illustrated in FIG. 1, air actuator 44 is aligned with the outer row of filter trains 56. The filter trains themselves are staggered annularly so that as indexing table 34 is indexed through a predetermined angle of rotation actuator 44 is aligned with a train 56 in the outer row and then after a subsequent indexing through the same angle, actuator 42 is aligned with the next train 56 in the inner row. Between adjacent trains 56 there is an indexing hole 81 to accommodate the plunger which is not being used to extend a filter train.

For locking in place, upper section 14 is provided with two or more pins 86 (only one of which is illustrated). Mounted on lower section 12 is an air cylinder 88 for each pin 86 with a locking element 92 actuated by the plunger 94 of air cylinder 88.

In the operation of the apparatus described, sampler 10 is placed in an area to be monitored. Sampler 10 may be placed on the floor, hung from the ceiling or a boom, or may be situated at any angular orientation. Indexing mechanism 36 is remotely energized to rotate index table 34 so that motor 42 or motor 44 is aligned under a filter train 56. Motors 42 and 44 are energized so that plungers 46 and 48 are urged outwardly, one of them causing a filter train 56 to extend out as shown by filter train 56 in FIG. 2. Vacuum pump 16 is then actuated, drawing environmental gas into the exposed filter train 56 through openings 72, depositing the particulate and the adsorbed gaseous components on the filter elements, the remaining gas leaving by way of port 74 into exhaust manifold 76, pipe 24, etc. Flow meter 18 records the size of gaseous flow and the remaining gas is exhausted through pipe 32. Pump 16 is operated at a rate sufficient to establish sonic velocity in critical orifice 22.

After a predetermined period of collection, such as 5 minutes, vacuum pump 16 and actuators 42 and 44 are de-energized. The exposed filter train 56 is retracted by its biasing spring 66 and the device is ready for its next sequence of sampling, which might occur after an interval of 10 minutes to several hours, for example, at which time indexing table 34 would be indexed to the next filter train 56. While both actuators 42 and 44 are simultaneously energized, only the one aligned with a filter train 56 actually functions.

At periodic intervals, when all of the mounted filter trains 56 contain samples, such as after 24 hours, sampler 10 will be serviced. Air cylinder locks 88 are de-energized releasing hook 92 from pin 86, and the upper section is removed in its entirety and a replacement section is mounted. It will be seen that conduit 82 slips out of female fitting 78 of the old section and into the replacement section quite readily.

Activation of sampler 10 as already described may be accomplished by manual manipulation of electric switches, remotely located in a control panel, or if desired the sequence may be automated in ways which are now well known in the art.

It is thus seen that there has been provided sampling apparatus capable of remote operation over relatively long periods of time and capable of convenient and quick servicing at regular intervals.

What is claimed is:

1. A sequential sampler comprising:
   a. An assembly of collectors for trapping selected ingredients in a gaseous fluid, each of said collectors individually movable between a first initial position in which entrance to each collector is blocked and a second position in which entrance is open, each of said collectors being normally biased into said initial position;
   b. motor means arranged to overcome the biasing to actuate in succession one collector at a time into the latter's second position only during a period of actual collection;
   c. common exhaust manifold means for all of said collectors including pump means for exhausting said manifold means while a collector is actuated into its second position, thereby causing each collector to trap a sample during a different period of time.

2. The sampler of claim 1 having critical orifice means for said gaseous fluid downstream of said collectors to assist in determination of flow conditions.

3. The sampler of claim 1 in which said assembly of collectors is mounted in a removable, stationary section which may be replaced when all of said collectors have completed their collection and said motor means is mounted independently of said assembly.

4. The sampler of claim 3 in which said collectors are uniformly spaced along the removable section and said motor means contains rotating indexing table means and actuation means supported thereon, the latter being moved into successive alignment with said collectors by said table means.

* * * * *